US012767090B2

(12) United States Patent
Patenaude et al.

(10) Patent No.: US 12,767,090 B2
(45) Date of Patent: Oct. 20, 2026

(54) SECURITY MONITORING SYSTEM FOR A VEHICLE

(71) Applicant: GM Global Technology Operations LLC, Detroit, MI (US)

(72) Inventors: Russell A. Patenaude, Macomb Township, MI (US); Eric T. Hosey, Rochester Hills, MI (US); Matthew Edward Gilbert-Eyres, Rochester Hills, MI (US); Noah Stone, West Bloomfield, MI (US); Craig Thomas Douglas, Pflugerville, TX (US)

(73) Assignee: GM Global Technology Operations LLC, Detroit, MI (US)

( * ) Notice: Subject to any disclaimer, the term of this patent is extended or adjusted under 35 U.S.C. 154(b) by 280 days.

(21) Appl. No.: 18/501,833

(22) Filed: Nov. 3, 2023

(65) Prior Publication Data

US 2025/0145112 A1 May 8, 2025

(51) Int. Cl.
*B60R 25/30* (2013.01)
*B60R 25/20* (2013.01)

(52) U.S. Cl.
CPC .......... *B60R 25/2063* (2013.01); *B60R 25/30* (2013.01)

(58) Field of Classification Search
CPC ............................ B60R 25/2063; B60R 25/30
See application file for complete search history.

(56) References Cited

U.S. PATENT DOCUMENTS 4,866,417 A * 9/1989 DeFino ............... B60R 25/1003 340/429
5,172,094 A * 12/1992 Stadler ................ B60R 25/1003 340/426.11
5,285,186 A * 2/1994 Chen ................... B60R 25/1003 340/426.25
5,479,156 A * 12/1995 Jones .................. B60R 25/1003 340/426.14
5,559,491 A * 9/1996 Stadler ................ B60R 25/1003 340/426.25
5,612,669 A * 3/1997 Allen .................... B60R 25/104 340/529
5,635,901 A * 6/1997 Weinblatt ................ B60R 25/04 340/426.36
5,850,174 A * 12/1998 DiCroce ............. B60R 25/1001 180/287
5,874,890 A * 2/1999 Mizutani ............. B60R 25/1003 340/428
10,486,649 B1 * 11/2019 Bennie ................ B60R 25/1004

(Continued)

*Primary Examiner* — Nay Tun
(74) *Attorney, Agent, or Firm* — Honigman LLP; Matthew H. Szalach

(57) ABSTRACT

A vehicle includes ignition controls operable between an active state and an inactive state and a storage compartment operable between a locked state and an unlocked state. An electronic control unit (ECU) is configured to detect one of the active state and the inactive state of the ignition controls and includes data processing hardware and memory hardware that stores a security monitoring system. The security monitoring system includes an alarm and a security monitoring application that is configured to execute a delay mode including a tiered proactive measure. The delay mode is configured to delay translation of the storage compartment from the locked state to the unlocked state in response to a security event.

19 Claims, 6 Drawing Sheets

(56) References Cited

U.S. PATENT DOCUMENTS

| | | | | |
|---|---|---|---|---|
| 2003/0169161 | A1* | 9/2003 | Brown | B60R 25/102 340/426.11 |
| 2012/0300598 | A1* | 11/2012 | Murray | G04G 13/02 368/251 |
| 2015/0375703 | A1* | 12/2015 | Modi | B60R 16/03 307/10.1 |
| 2017/0230831 | A1* | 8/2017 | Canis | H04W 64/006 |
| 2019/0065714 | A1* | 2/2019 | Adams | G06F 21/32 |
| 2019/0143944 | A1* | 5/2019 | Park | G01S 13/04 340/426.24 |
| 2020/0160633 | A1* | 5/2020 | Zhang | B60R 25/102 |
| 2020/0238952 | A1* | 7/2020 | Lindsay | G06V 30/194 |
| 2020/0290567 | A1* | 9/2020 | Funyak | B60R 25/102 |
| 2024/0339033 | A1* | 10/2024 | Chamberlin | G08G 1/166 |

* cited by examiner

SECURITY MONITORING SYSTEM FOR A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a security monitoring system for a vehicle.

Vehicles often utilize alarm systems to deter theft. Often, the alarm systems include modes that may incorporate a fixed delay. The fixed delay may be activated manually or may be active at all times. Further, vehicles may deter potential intruders using audio alarms and integrated systems to contact personnel in the event of a theft or tampering of the vehicle. These alarm systems typically consist of audio alerts and, in some instances, visual alerts, such as flashing lights. The alarm system may be configured as part of a controller of the vehicle and has settings to trigger the alarm system in response to an event related to the vehicle. Typically, the alarm system is programmed to be triggered when the vehicle is locked, which may be one method of manually activating the fixed delay of the alarm system.

SUMMARY

In some aspects, a computer-implemented method when executed by data processing hardware causes the data processing hardware to perform operations including determining an inactive state of ignition controls of a vehicle and activating a security monitoring application in response to the determined inactive state of the ignition controls. The operations further include monitoring for one or more security event via the security monitoring application, detecting a security event by the security monitoring application, and determining an alarm status of a security monitoring system in response to the detected security event. A state of a delay mode of the security monitoring application is determined, and a tiered proactive measure is executed in response to the determined alarm status and the determined state of the delay mode.

In some examples, an inactive status of an alarm of the security monitoring system may be detected when determining the alarm status. The tiered proactive measure may include executing one or more reminder measures. In some operations, determining the state of the delay mode may include detecting an enabled state of the delay mode and executing the tiered proactive measure may include executing one or more minor measures. Optionally, determining the alarm status may include detecting activation of the alarm of the security monitoring system. Determining the state of the delay mode may include detecting a disabled state of the delay mode, and wherein executing the tiered proactive measure includes executing one or more moderate measures. In some configurations the operations may include activating a time delay of the delay mode and authorizing an override function of the security monitoring application. The operation of determining the state of the delay mode may include detecting an enabled state of the delay mode, and wherein executing the tiered proactive measure includes executing one or more maximum measures, and detecting the enabled state of the delay mode may include preventing an override function of the security monitoring application.

In other aspects, a security monitoring system includes data processing hardware and memory hardware in communication with the data processing hardware. The memory hardware stores instructions that when executed on the data processing hardware cause the data processing hardware to perform operations. The operations include determining an inactive state of ignition controls of a vehicle, activating a security monitoring application in response to the determined inactive state of the ignition controls, and monitoring for one or more security events via the security monitoring application. The operations further include determining an alarm status of a security monitoring system in response to the detected security event, determining a state of a delay mode of the security monitoring application, and executing a tiered proactive measure in response to the determined alarm status and the determined state of the delay mode.

In some examples, determining the alarm status includes detecting an inactive status of an alarm of the security monitoring system. Executing the tiered proactive measure may include executing one or more reminder measures. Optionally, determining the state of the delay mode may include detecting an enabled state of the delay mode, and executing the tiered proactive measure includes executing one or more minor measures. In some configurations, the operation of determining the alarm status may include detecting activation of the alarm of the security monitoring system. Determining the state of the delay mode may include detecting a disabled state of the delay mode, and executing the tiered proactive measure may include executing one or more moderate measures. In some instances, determining the state of the delay mode may include detecting an enabled state of the delay mode, and executing the tiered proactive measure may include executing one or more maximum measures.

In yet other aspects, a vehicle includes ignition controls operable between an active state and an inactive state and a storage compartment operable between a locked state and an unlocked state. An electronic control unit (ECU) is configured to detect one of the active state and the inactive state of the ignition controls and includes data processing hardware and memory hardware that stores a security monitoring system. The security monitoring system includes an alarm and a security monitoring application that is configured to execute a delay mode including a tiered proactive measure. The delay mode is configured to delay translation of the storage compartment from the locked state to the unlocked state in response to a security event.

In some examples, the tiered proactive measure may include at least one of a reminder measure, a minor measure, a moderate measure, and a maximum measure. Optionally, the vehicle may include sensors that may be communicatively coupled to the ECU. The ECU may be configured to receive sensor data from the sensors corresponding to the security event. In some configurations, a security monitoring system may include the security monitoring application.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
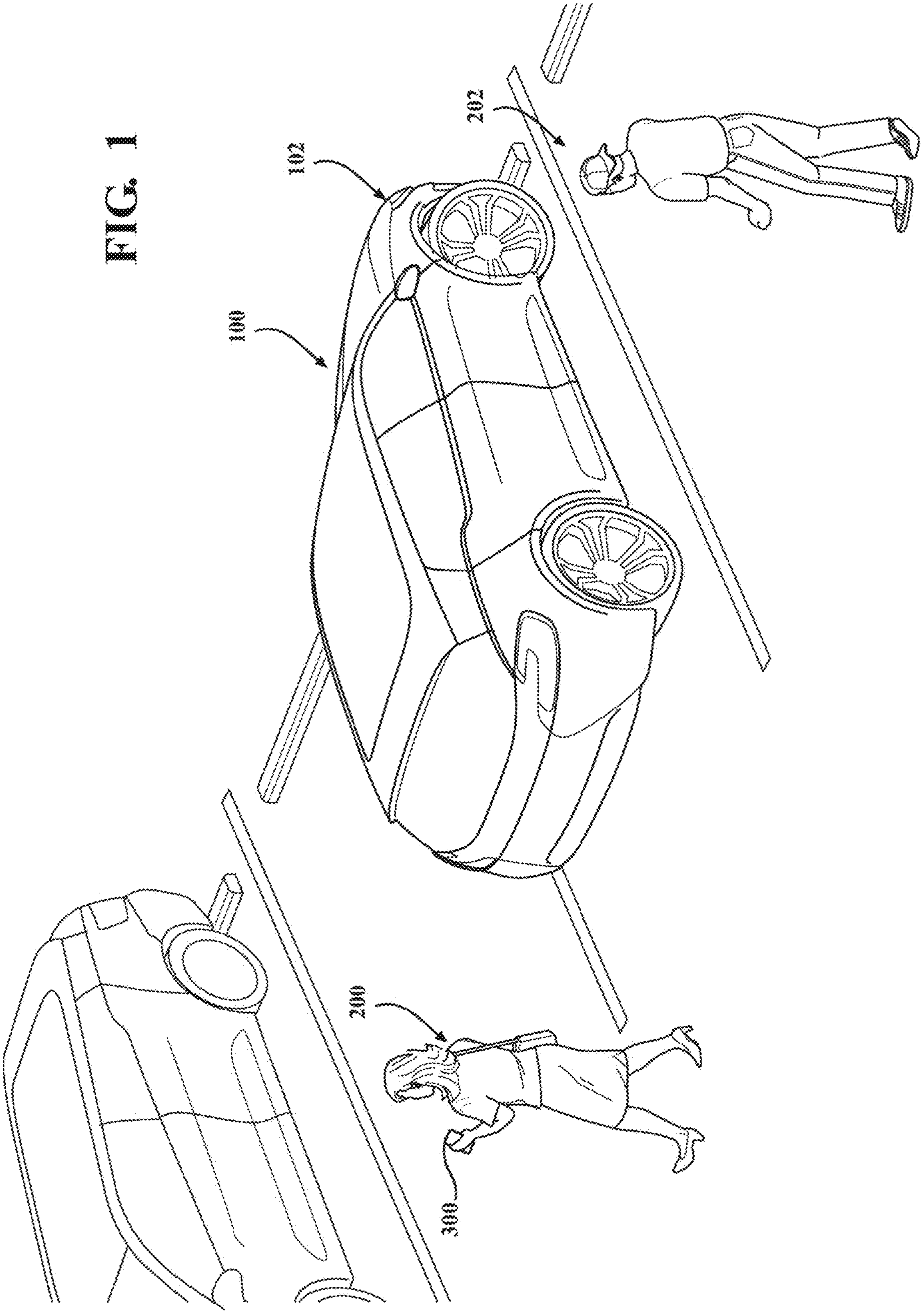
FIG. 1 is an example schematic of a vehicle equipped with a security monitoring system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
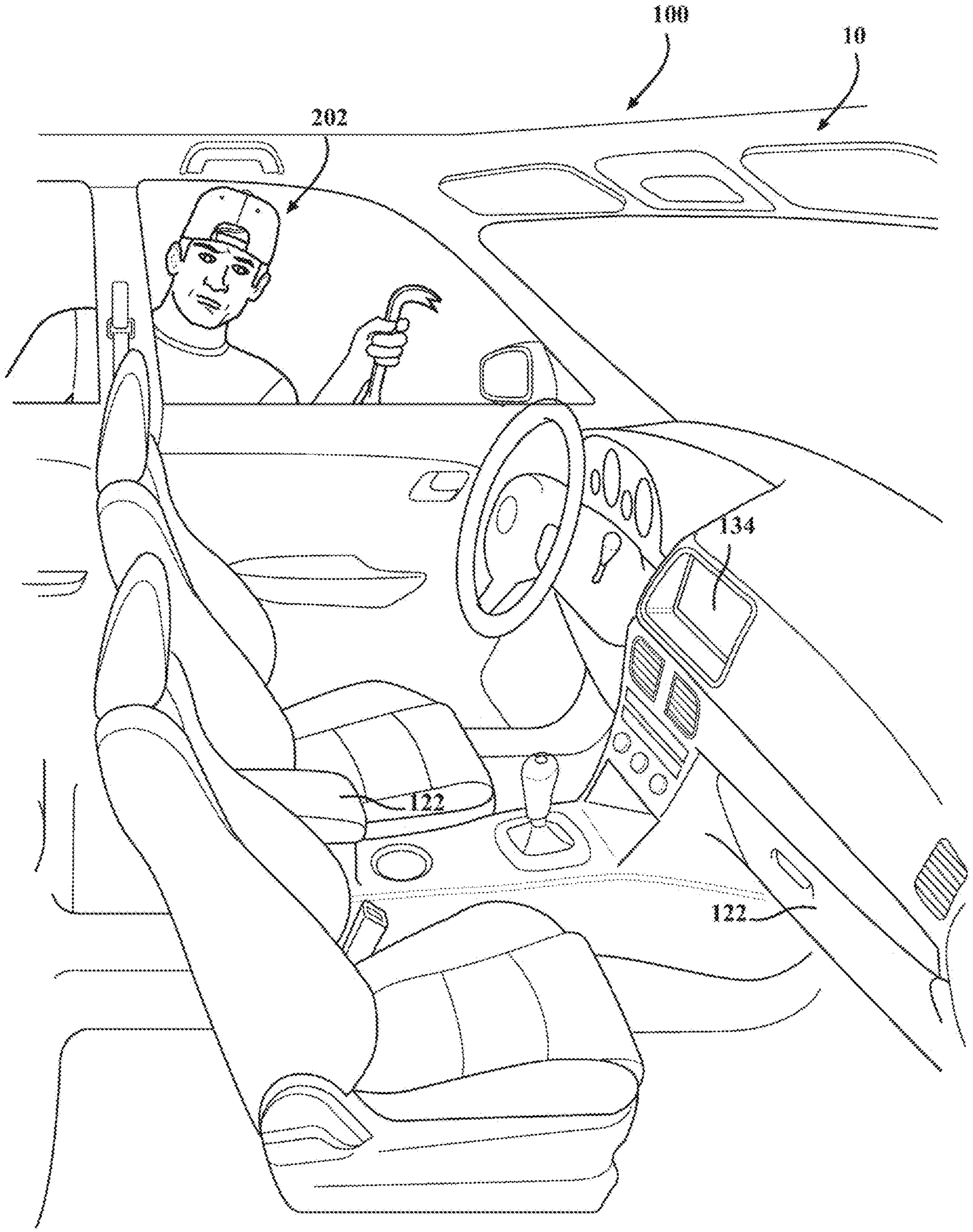
FIG. 2 is an example schematic of a third-party intruder and a vehicle equipped with a security monitoring system according to the present disclosure.
Figure 3:
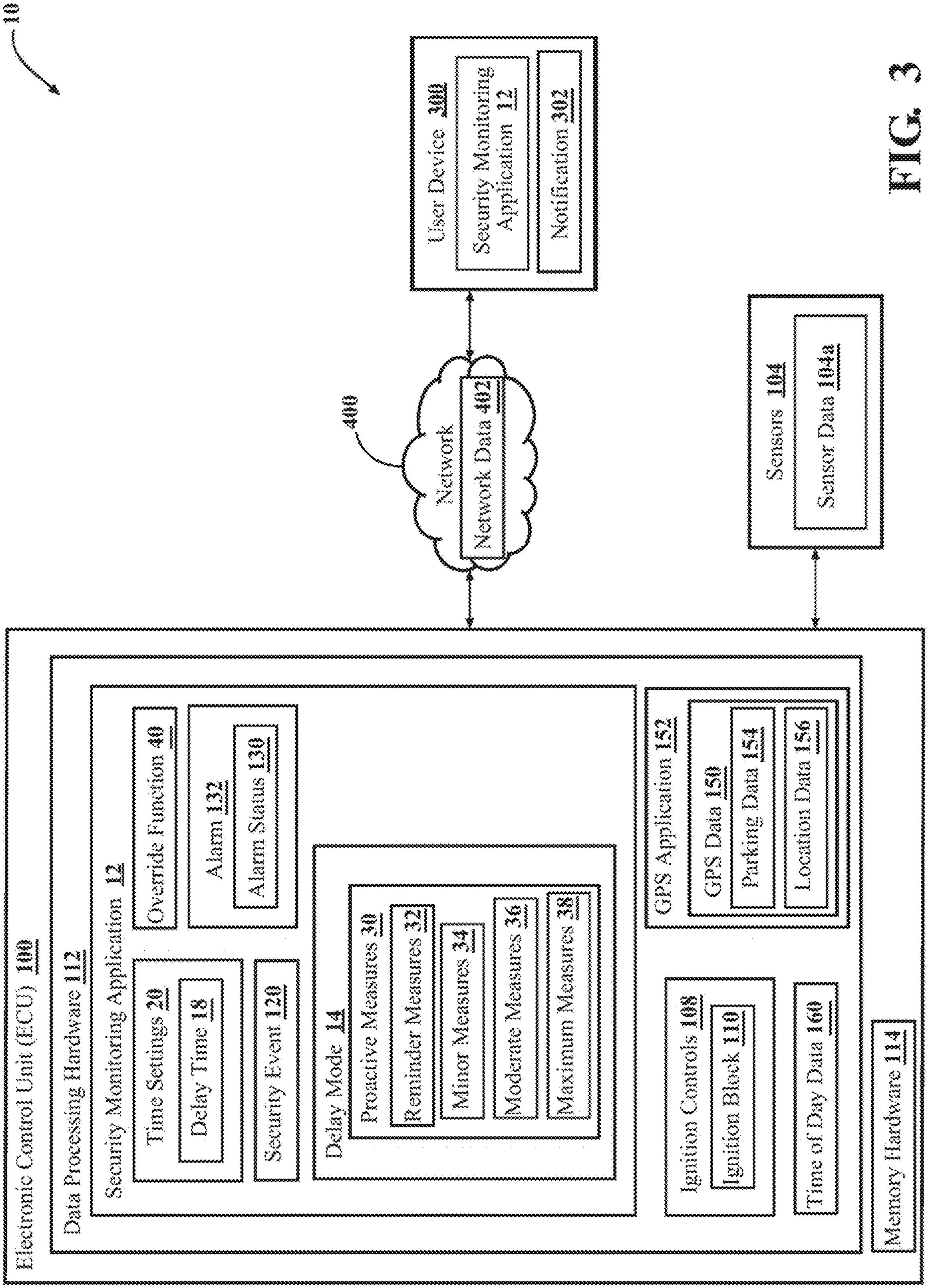
FIG. 3 is a functional block diagram of a security monitoring system according to the present disclosure.

Referring to FIGS. 1-3, a vehicle 100 is illustrated in a parked position 102 with a driver or user 200 walking away from the vehicle 100. The user 200 is illustrated as holding a user device 300. A third-party pedestrian or third-party intruder 202 is illustrated as approaching the vehicle 100. The third-party intruder 202 may attempt to enter the vehicle 100, as illustrated in FIG. 2. In some instances, the third party pedestrian 202 may be passing by the vehicle 100 and may also include a plurality of third-party pedestrians 202 passing by the vehicle 100. As described herein, the vehicle 100 is equipped with a security monitoring system 10. The security monitoring system 10 is configured to monitor the third-party pedestrian(s) 202 via a plurality of sensors 104 disposed in and along the vehicle 100. The sensors 104 are configured to collect sensor data 104*a*, which may include image data of the third-party pedestrian(s) 202 proximate to the vehicle 100. The sensors 104 may include, but are not limited to, imagers, capacitive sensors, microphones, and any other practicable sensor to monitor the interior and exterior surroundings of the vehicle 100.

The security monitoring system 10 generally includes the user device 300 and an electronic control unit (ECU) 106 of the vehicle 100. For example, the security monitoring system 10 may utilize a network 400 to interconnect the user device 300 and the ECU 106. The security monitoring system 10 includes a security monitoring application 12 configured with a delay mode 14. It is contemplated that the security monitoring application 12 may be configured on the user device 300 and/or may be configured on the ECU 106 of the vehicle 100. The security monitoring application 12 is configured to be cooperatively incorporated on one or both of the user device 300 and the ECU 106, such that the user 200 may easily adjust, alter, and/or activate the security monitoring application 12 regardless of whether the user 200 is within the vehicle 100, proximate the vehicle 100, and/or away from the vehicle 100.

The user 200 may enable or disable the delay mode 14 via the security monitoring application 12 via the user device 300, and the security monitoring application 12 is updated on the ECU 106 as well. While the security monitoring application 12 is configured to enable the delay mode 14 in response to user inputs, it is also contemplated that the security monitoring system 10 may automatically activate the security monitoring application 12 to enable the delay mode 14 in response to one or more of time of day data 160 and inactivity of the user 200 with the vehicle 100.

With further reference to FIGS. 1-3, the ECU 106 is configured to monitor and/or execute ignition controls 108 operable between an active state and an inactive state. The ECU 106 is configured to detect the active state and the inactive state of the ignition controls 108 and, in response, activate the security monitoring application 12. The ECU 106 may execute an ignition block 110 as part of the security monitoring application 12. The ignition block 110 is configured to prevent translating the ignition controls 108 into the active state. The ignition block 110 is configured as part of the ECU 106 and may be activated by the security monitoring application 12. The ignition block 110 may be manually set as part of the delay mode 14 and/or may be automatically activated by the security monitoring system 10 based on various data, described herein, and the ignition controls 108 being in the inactive state.

The ECU 106 includes data processing hardware 112 and memory hardware 114 that is in communication with the data processing hardware 112. It is contemplated that the security monitoring system 10 includes a computer-implemented method that is executed by the data processing hardware 112 and causes the data processing hardware 112 to perform various operations, described herein. Additionally or alternatively, the memory hardware 114 may store the computer-implemented method as an instruction that, when executed on the data processing hardware 112, causes the data processing hardware 112 to perform the operations described herein.

With continued reference to FIGS. 1-3 and as mentioned above, the security monitoring system 10 may interconnect the user device 300 with the ECU 106 via the network 400 to communicate inputs on the user device 300 with the ECU 106. For example, the user device 300 may receive inputs to activate the security monitoring application 12 in response to the network 400 communicating a detected security event 120 with the user device 300. The security monitoring system 10 may detect a security event 120 based on the third-party intruder 202 engaging the vehicle 100. The security event 120 may include, but is not limited to, unauthorized engagement with the exterior of the vehicle 100, unauthorized entry to the vehicle 100, unauthorized attempted activation of the ignition controls 108, and/or unauthorized access of compartments of the vehicle 100.

In some examples, the security event 120 may include suspicious activity including repeated or prolonged loitering proximate to the vehicle 100. The sensors 104 may be utilized to monitor any third-party pedestrians 202 proximate to the vehicle 100, and the security monitoring system 10 may utilize the sensor data 104*a* to automatically activate the security monitoring application 12 and delay mode 14. The user device 300 may receive a notification or alert 302 corresponding to the security event 120 prompting the user 200 to enable the delay mode 14 of the security monitoring application 12, if the delay mode 14 is disabled. Additionally or alternatively, the security monitoring system 10 may automatically enable the delay mode 14.

Referring still to FIGS. 1-3, the delay mode 14 is configured to restrict access for a configurable amount of time after the delay mode 14 is enabled. The delay mode 14 prevents access to various storage compartments and/or access features 122, collectively referred to herein as storage compartments 122, of the vehicle 100. For example, the delay mode 14 may disallow access to access features 122, such as windows and seat controls and prevent access to storage compartments 122, such as a glovebox, a trunk, a frunk, a center console, and/or any other practicable storage compartment. In some examples, the delay mode 14 may include delayed access to the vehicle 100, locking seats of the vehicle 100 in a laydown mode, restricting access to the storage compartments 122, and activating the ignition block 110. The delay mode 14 is configured to prevent access to one or more of the vehicle 100, the ignition controls 108, and the storage compartments 122 for a delay time 18, set within time settings 20 of the security monitoring application 12. For example, the storage compartments 122 are operable between an unlocked state and a locked state, and the delay mode 14 is configured to place or maintain the storage compartments 122 in the locked state for, at least, the delay time 18. In some examples, the delay mode 14 is configured to delay translation of the storage compartments 122 from the locked state to the unlocked state in response to the security event 120.

The delay mode 14 includes one or more tiered proactive measures 30, which includes reminder measures 32, minor measures 34, moderate measures 36, and maximum measures 38. The proactive measures 30 are dependent upon various status points of the security monitoring application 12. For example, determining which of the proactive measures 30 to enable may depend upon an alarm status 130 of an alarm 132 of the vehicle 100. The alarm 132 may be activated by the user or may remain inactive. When the alarm status 130 corresponds to the alarm 132 being inactive, the security monitoring system 10 may issue proactive measures 30 commensurate with a lower degree of severity. The lower degree of severity generally corresponds with the reminder measures 32 and the minor measures 34, which may be categorized as lower tier proactive measures 32, 34. For example, the user may have intended to leave the alarm 132 inactive or may have, alternatively, unintentionally left the alarm status 130 as inactive. When the security monitoring system 10 determines that the alarm status 132 includes an inactive status, the security monitoring application 12 may issue, in response to the detected inactive status, one of the lower tier proactive measures 32, 34.

In determining which of the lower tier proactive measures 32, 34 to issue, the security monitoring application 12 determines whether the delay mode 14 is in an enabled state or a disabled state. If the delay mode 14 is in the disabled state, and the alarm 132 has the inactive status, then the security monitoring application 12 may issue the reminder proactive measure 32. The reminder proactive measure 32 is configured to send a notification or alert 302 to the user device 300 and/or display the notification 302 on an infotainment device 134 of the vehicle 100 to remind the user 200 to activate the alarm 132 and the delay mode 14. In this example, the user 200 may have unintentionally left the alarm 132 inactive and the delay mode 14 disabled, such that the security monitoring application 12 is configured to remind the user of the available functions of the security monitoring system 10 via the reminder proactive measures 32. The notification 302 may include, but is not limited to, an audible alert and/or a visual alert to remind the user 200 that the alarm 132 and the delay mode 14 were not activated and enabled.

If the delay mode 14 is in the enabled state and the alarm 132 has the active status, then the security monitoring application 12 may enable the minor proactive measures 34. The minor proactive measures 34 may include, but are not limited to, an alert within the vehicle 100 indicating recording via the sensors 104, which may include uploading the sensor data 104*a*, a timer countdown, and disabling an override function 40. The override function 40 is configured to provide the user with the ability to override the delay time 18 to gain access to the storage compartments 122. However, if the enabled delay mode 14 is triggered when the alarm 132 is inactive, the security monitoring system 10 may determine that the third-party intruder 202 may be attempting to gain access to the storage compartments 122. Thus, the security monitoring system 10 is configured to prevent the override function 40 to secure the storage compartments 122 and deter the third-party 202.

In another example, the security monitoring system 10 may detect that the alarm 132 has an active status set by the user 200, and the security monitoring system 10 may determine whether the delay mode 14 is enabled. If the delay mode 14 is disabled, then the security monitoring system 10 automatically activates the delay time 18, but allows for execution of the override function 40 by the user 200. In this example, it is contemplated that the user 200 may accidentally trigger the alarm 132 while trying to gain access to a storage compartment 122. Thus, the override functions 40 may be executed by the user 200 to deactivate the delay mode 14. The override functions 40 may include a security pin entered into the security monitoring application 12 by the user 200. Additionally or alternatively, the user 200 may answer a series of security questions via the security monitoring application 12. It is contemplated that the override functions 40 may include any practicable functionality to override the delay mode 14 as incorporated in the security monitoring application 12.

If the delay mode 14 is disabled and the alarm 132 is activated, then the security monitoring application 12 issues the moderate proactive measures 36. The moderate proactive measures 36 include, but are not limited to, projecting an additional alarm and/or issuing audible and visual alerts indicating activation of the delay mode 14. The moderate measures 36 are configured to deter any potential third-party intruder 202 from pursuing access to the vehicle 100 and respective storage compartments 122. However, if the third-party intruder 202 continues, the moderate proactive measure 36 also translates the storage compartment 122 from any potential unlocked state(s) to the locked state. Thus, the third-party intruder 202 is prevented from accessing the storage compartments 122. If the alarm 132 is activated and the delay mode 14 is enabled, then the security monitoring application 12 is configured to prevent the override function 40 and issues the maximum proactive measures 38. The maximum measures 38 include functions similar to the moderate measure 36, except that the maximum measures 38 also prevent the override function 40. It is contemplated that both the moderate measures 36 and the maximum measures 38 may be collectively categorized as higher tier proactive measures 36, 38. The higher tier proactive measures 36, 38 may also initiate the ignition block 110 in response to the detected security event 120.

Referring to FIGS. 3-6, the security monitoring system 10 is configured to provide a progressive, layered process for limiting access to the vehicle 100 and the storage compartments 122 via the delay mode 14. The security monitoring system 10 may tailor the degree of delay based on the active or inactive status of the alarm 132 and the enabled or disabled state of the delay mode 14. The security monitoring application 12 is configured to execute the layered access by deploying the respective, tiered proactive measures 30. The tiered proactive measures 30 advantageously deter third-party intruders 202, or other unauthorized third-party persons, from gaining access to the vehicle 100, while maintaining ease-of-use by the authorized user 200.

In addition utilizing the status of the alarm 132, the security monitoring system 10 may also utilize Global Positioning System (GPS) data 150 of the vehicle 100. The ECU 106 may include a GPS application 152 that gathers the GPS data 150, which may be communicated with the security monitoring application 12. The GPS data 150 includes parking data 154 and/or location data 156 associated with the vehicle 100. The security monitoring system 10 may utilize the GPS application 152 to further assist in determining which of the tiered proactive measures 30 to enable. The GPS application 152 may indicate, based on the GPS data 150, that the vehicle 100 is located in a location corresponding to high crime or otherwise a high likelihood that a third-party intruder 202 may attempt to access the vehicle 100. The GPS data 150 may assist in informing which of the tiered proactive measures 30 is enabled and enablement of the delay mode 14. For example, the security monitoring application 12 may execute the maximum proactive measure 38 in response to the GPS data 150 of the vehicle 100 corresponding to a high crime location. A crime rate may be provided by the network 400, which captures the GPS data 150 from the GPS application 152.

It is contemplated that the security monitoring application 12 may enable the higher tier proactive measures 36, 38 in response to a high crime location based on the GPS data 150. As mentioned above, the higher tier proactive measures 36, 38 may include activating the ignition block 110 to prevent utilization of the ignition controls 108. In particular examples, the security monitoring system 10 may activate the ignition block 110 via the higher tier proactive measures 36, 38 in response to the GPS data 150. The security monitoring system 10 first determines whether ignition controls 108 are in an inactive state, which corresponds to the vehicle 100 being inactive. Once the ECU 106 determines that the vehicle 100 is inactive, the security monitoring system 10 may execute the method to determine which of the tiered proactive measures 30 to enable by activating the security monitoring application 12.

The network 400 may also provide the ECU 106 with updated network data 402 related to the GPS data 150 of the vehicle 100. The updated data 402 may include higher crime areas and/or thefts detected in the location of the vehicle 100. For example, the network 400 may communicate the network data 402 including any thefts proximate the vehicle 100 based on the GPS data 150. In some instances, the GPS data 150 may indicate that the vehicle 100 is located at a home of the user 200, such that the security monitoring system 10 may prompt enablement of the lower tier proactive measures 32, 34. Further, the ECU 106 may utilize time of day data 160, which may assist when determining which of the tiered proactive measures 30 to enable. For example, the higher tier proactive measures 36, 38 may be enabled after sunset, regardless of the location of the vehicle 100. The security monitoring system 10 may also identify whether the vehicle 100 has been left unattended or otherwise inactive for a period of time, which may indicate that the user 200 intended to secure the vehicle 100. For example, the security monitoring system 10 may detect the vehicle 100 has not been opened for the period of time after the ignition controls 208 are in the inactive state. In response, the security monitoring system 10 may activate the security monitoring system 10 and a respective tiered proactive measure 30. It is also contemplated that the security monitoring system 10 may execute some of the tiered proactive measures 30 for an increased duration beyond the security event 120.

Referring still to FIGS. 3-6, the security monitoring system 10 may also be configured to adapt based on previous-use cycles. In some examples, the ECU 106 may determine which of the tiered proactive measures 30 were enabled during a previous ignition cycle. The ECU 106 may store the respective data in the memory hardware 114 and may activate the security monitoring application and the respective tiered proactive measure 30. Thus, the security monitoring system 10 may automatically predict which of the tiered proactive measures 30 to enable based on the GPS data 150, the network data 402, manual inputs by the user, and the time of day data 160. The ECU 106 executes the computer-implemented method of the security monitoring system 10 based on one or more of detecting the alarm status 130, the GPS data 150, the network data 402, manual inputs, and time of day data 160. Once the security monitoring system 10 determines the ignition controls 108 are in the inactive state, the security monitoring system 10 activates the security monitoring application 12, which continuously monitors for the security event 120 for further activation of the operations by the data processing hardware 112 of the ECU 106.

Figure 4:
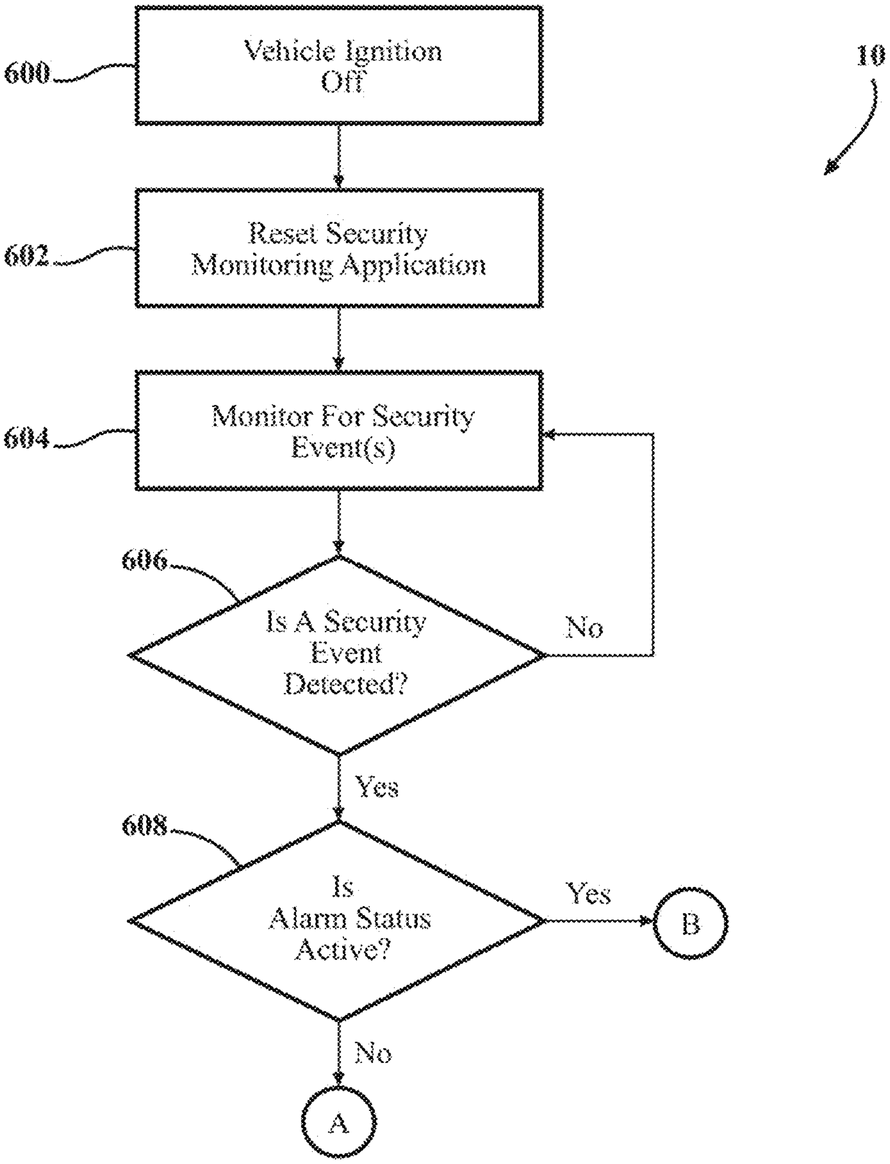
FIG. 4 is an example flow diagram for a security monitoring system according to the present disclosure.
Figure 5:
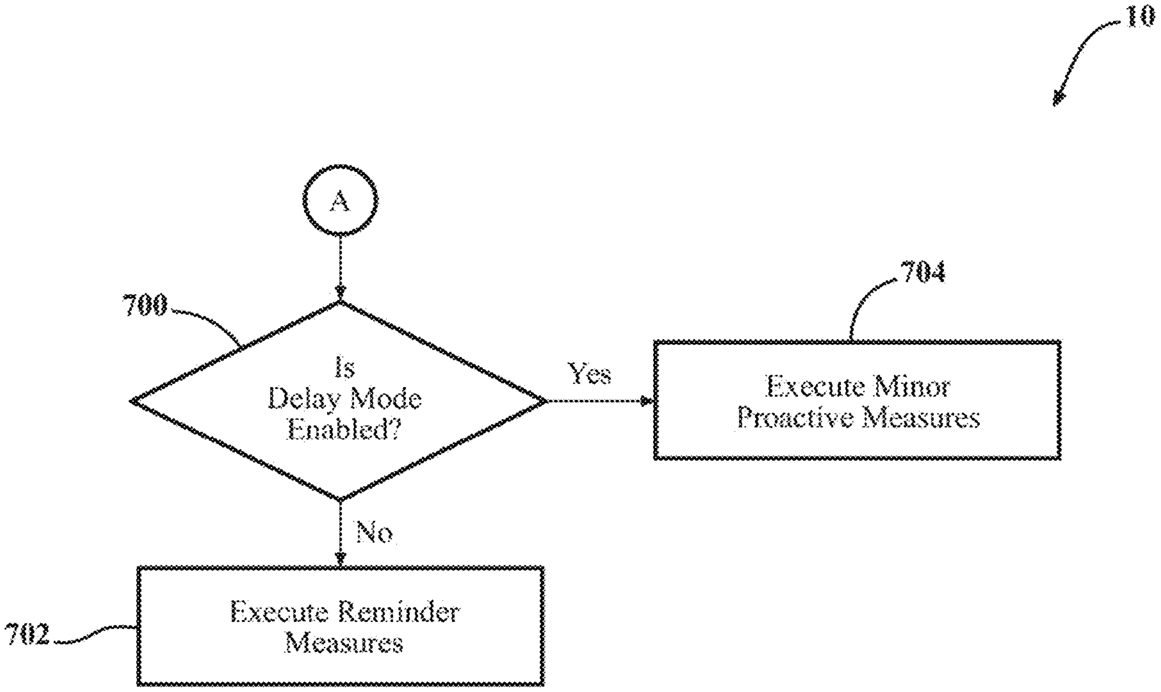
FIG. 5 is an example flow diagram for the security monitoring system of FIG. 4.
Figure 6:
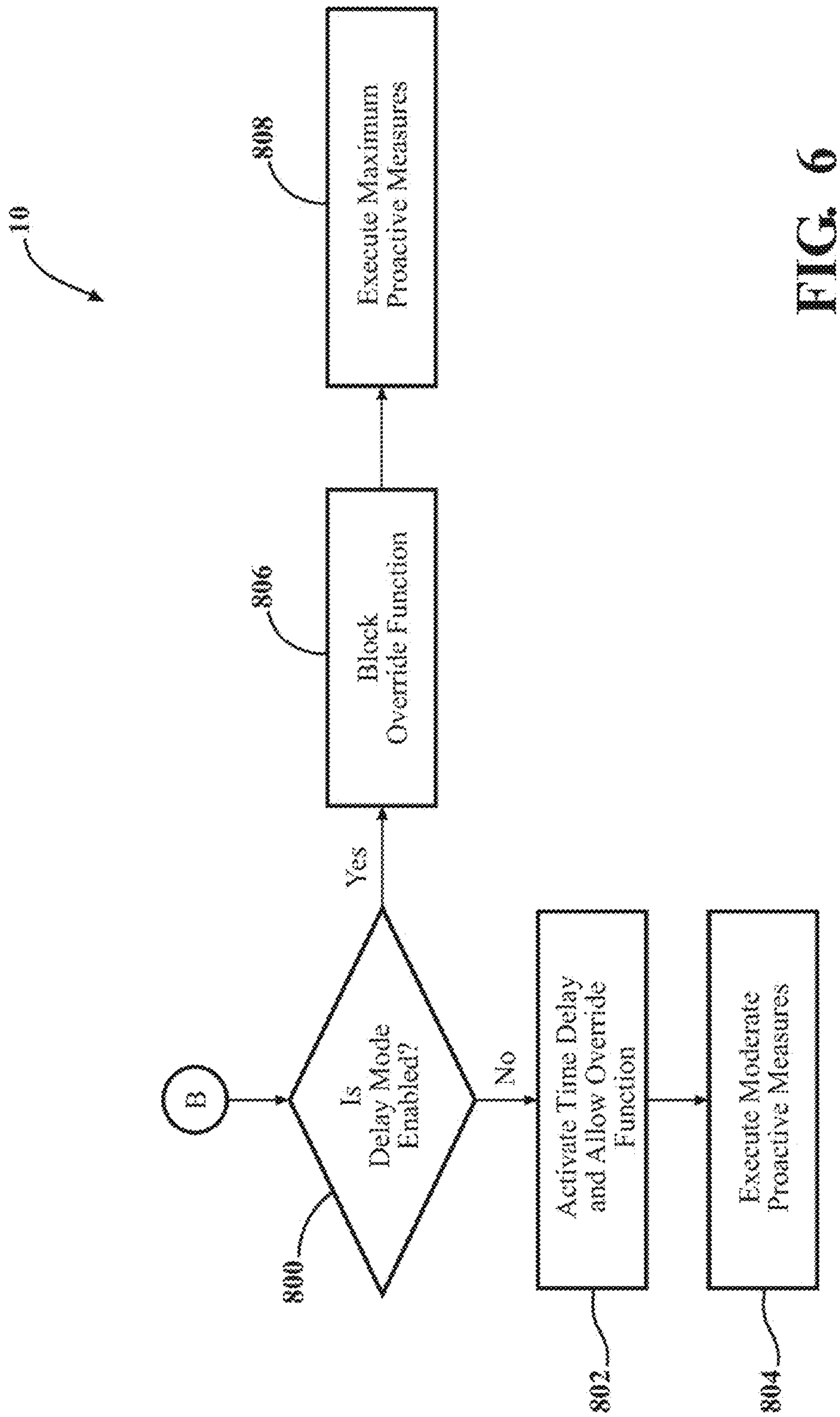
FIG. 6 is another example flow diagram for the security monitoring system of FIG. 4.

Example flow diagrams of the computer-implemented method are set forth in FIGS. 4-6. At 600, the security monitoring system 10 determines that the ignition controls 108 are switched off corresponding to the inactive state. The security monitoring system 10, at 602, activates or otherwise resets the security monitoring application 12 in response to the determined inactive state of the ignition controls 108, and at 604, monitors for one or more security events 120 via the security monitoring application 12. The security monitoring system 10, at 606, determines whether a security event 120 is detect, and if no security event 120 is detected, continues to monitor for a security event 120. If a security event 120 is detected, then the security monitoring system 10, at 608 determines whether the alarm status 130 is active.

If the alarm status 130 is inactive, the security monitoring system, at 700, determines whether the delay mode 14 is enabled. If the delay mode 14 is disabled, then the security monitoring system 10, at 702, executes the reminder measures 32. If the delay mode 14 is enabled, then the security monitoring system 10, at 704, executes the minor proactive measures 34.

If the alarm status 130 is active, the security monitoring system, at 800, determines whether the delay mode 14 is enabled. If the delay mode 14 is disabled, then the security monitoring system, at 802, activates the delay time 18 and authorizes the override function 40. The security monitoring system 10 may then, at 804, execute the moderate proactive measures 36. If the delay mode 14 is disabled, then the security monitoring system 10, at 806, prevents the override function 40 and, at 808, executes the maximum proactive measures 38.

Referring again to FIGS. 1-6, the security monitoring system 10 advantageously provides the user 200 with improved security for the equipped vehicle 100. The tiered proactive measures 30 provide the user with a layered security monitoring system 10, which may automatically predict when to enable the delay mode 14. The automatic determination may be based on a variety of data points including, but not limited to, the parking data 154 associated with a home location, inactivity of the vehicle 100 for a period of time after the ignition controls 108 is in the inactive state, and/or the vehicle 100 being locked by the user 200 in a large parking area. The security monitoring system 10 utilizes the data points to determine the severity of the tiered proactive measures 30 to implement, in particular, whether to implement the lower tier proactive measure 32, 34 or the higher tier proactive measures 36, 38.

Further, the security monitoring system 10 may adjust the enabled tiered proactive measures 30 based on foot traffic surrounding or near the vehicle 100 and/or the network data 402. In some examples, the delay mode 14 may be configured to delay an algorithm of the ECU 106 to prevent digital information from being lifted from the vehicle 100. For example, the security monitoring system 10 may delay, via the delay mode 14, upload and/or download speeds from various ports within the vehicle 100 and may prevent factory resets. In further instances, the security monitoring system 10 may cooperate with the network 400 to contact a communication server via the network 400. The communication server may be projected into the vehicle 100 to alert the third-party intruder 202 that the security monitoring system 10 and the delay mode 14 are enabled. Thus, the security monitoring system 10 advantageously provides automatically customized security for the vehicle 100.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method that, when executed by data processing hardware, causes the data processing hardware to perform operations comprising:

determining an inactive state of ignition controls of a vehicle;

activating a security monitoring application in response to the determined inactive state of the ignition controls;

monitoring for one or more security events via the security monitoring application;

detecting a security event by the security monitoring application;

determining an alarm status of a security monitoring system in response to the detected security event;

determining a state of a delay mode of the security monitoring application, the delay mode being configured to restrict access to the vehicle for a configured amount of time after the delay mode is in an enabled state; and executing a tiered proactive measure in response to the determined alarm status and the determined state of the delay mode.

2. The method of claim 1, wherein determining the alarm status includes detecting an inactive status of an alarm of the security monitoring system.

3. The method of claim 2, wherein executing the tiered proactive measure includes executing one or more reminder measures.

4. The method of claim 2, wherein determining the state of the delay mode includes detecting the enabled state of the delay mode and executing the tiered proactive measure includes executing one or more first tier measures.

5. The method of claim 2, wherein determining the alarm status includes detecting activation of the alarm of the security monitoring system.

6. The method of claim 5, wherein determining the state of the delay mode includes detecting a disabled state of the delay mode, and wherein executing the tiered proactive measure includes executing one or more second tier measures.

7. The method of claim 6, further including activating a time delay of the delay mode and authorizing an override function of the security monitoring application.

8. The method of claim 5, wherein determining the state of the delay mode includes detecting the enabled state of the delay mode and preventing an override function of the security monitoring application, and wherein executing the tiered proactive measure includes executing one or more third tier measures.

9. The method of claim 1, further including detecting the enabled state of the delay mode and restricting access to one or more of the vehicle, ignition controls, and storage components.

10. A security monitoring system comprising:
- data processing hardware; and
- memory hardware in communication with the data processing hardware, the memory hardware storing instructions that when executed on the data processing hardware cause the data processing hardware to perform operations comprising:
  - determining an inactive state of ignition controls of a vehicle;
  - activating a security monitoring application in response to the determined inactive state of the ignition controls;
  - monitoring for one or more security events via the security monitoring application;
  - detecting a security event by the security monitoring application;
  - determining an alarm status of the security monitoring system in response to the detected security event;
  - determining a state of a delay mode of the security monitoring application, the delay mode being configured to restrict access to the vehicle for a configured amount of time after the delay mode is in an enabled state; and
  - executing a tiered proactive measure in response to the determined alarm status and the determined state of the delay mode.

11. The security monitoring system of claim 10, wherein determining the alarm status includes detecting an inactive status of an alarm of the security monitoring system.

12. The security monitoring system of claim 11, wherein executing the tiered proactive measure includes executing one or more reminder measures.

13. The security monitoring system of claim 11, wherein determining the state of the delay mode includes detecting the enabled state of the delay mode and executing the tiered proactive measure includes executing one or more first tier measures.

14. The security monitoring system of claim 11, wherein determining the alarm status includes detecting activation of the alarm of the security monitoring system.

15. The security monitoring system of claim 14, wherein determining the state of the delay mode includes detecting a disabled state of the delay mode, and wherein executing the tiered proactive measure includes executing one or more second tier measures.

16. The security monitoring system of claim 14, wherein determining the state of the delay mode includes detecting the enabled state of the delay mode, and wherein executing the tiered proactive measure includes executing one or more third tier measures.

17. A vehicle comprising:
- ignition controls configured to operate between an active state and an inactive state;
- a storage compartment of the vehicle, the storage compartment configured to operate between a locked state and an unlocked state;
- an electronic control unit (ECU) configured to detect one of the active state and the inactive state of the ignition controls and including data processing hardware and memory hardware storing a security monitoring system, the security monitoring system including an alarm and a security monitoring application configured to execute a delay mode including a tiered proactive measure, the delay mode configured to restrict access to the storage compartment for a configured amount of time after the delay mode is in an enabled state, the restricted access including a delayed transition of the storage compartment from the locked state to the unlocked state in response to a security event.

18. The vehicle of claim 17, wherein the tiered proactive measure includes one or more of a reminder measure, a first tier measure, a second tier measure, and a third tier measure.

19. The vehicle of claim 17, further including sensors communicatively coupled to the ECU, the ECU configured to receive sensor data from the sensors corresponding to the security event.

* * * * *